(12) United States Patent
Lacaze et al.

(10) Patent No.: US 11,912,406 B2
(45) Date of Patent: Feb. 27, 2024

(54) PARAMOTOR WITH CONTRAROTATING PROPELLERS

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, MD (US); William Becker, Monrovia, MD (US); Steven Rotundo, Baltimore, MD (US)

(73) Assignee: Robotic Research OpCo, LLC, Clarksburg, MD (US)

( * ) Notice: Subject to any disclaimer, the term of this patent is extended or adjusted under 35 U.S.C. 154(b) by 531 days.

(21) Appl. No.: 16/939,451

(22) Filed: Jul. 27, 2020

(65) Prior Publication Data
US 2022/0024575 A1    Jan. 27, 2022

(51) Int. Cl.
| | |
|---|---|
| *B64C 31/036* | (2006.01) |
| *B64C 11/48* | (2006.01) |
| *B64D 27/02* | (2006.01) |
| *B64C 11/00* | (2006.01) |
| *B64C 15/02* | (2006.01) |
| *B64D 5/00* | (2006.01) |

(52) U.S. Cl.
CPC .......... *B64C 31/036* (2013.01); *B64C 11/001* (2013.01); *B64C 11/48* (2013.01); *B64C 15/02* (2013.01); *B64D 5/00* (2013.01); *B64D 27/02* (2013.01); *B64D 2027/026* (2013.01)

(58) Field of Classification Search
CPC ............ B64C 31/036; B64D 1/02; B64D 5/00
See application file for complete search history.

(56) References Cited

U.S. PATENT DOCUMENTS

| | | | | | |
|---|---|---|---|---|---|
| 4,424,945 | A | * | 1/1984 | Dell ...................... | B64C 31/036 244/142 |
| 4,657,207 | A | * | 4/1987 | Poling ...................... | B60F 5/02 180/7.4 |
| 4,824,047 | A | * | 4/1989 | Chadwick ................ | B64D 5/00 244/63 |

(Continued)

OTHER PUBLICATIONS

Website: www.paraject.com/US/; "Paraject Paramotors: the Sky's Your Playground" download date: Mar. 24, 2023; 5 pps.

(Continued)

*Primary Examiner* — Joshua J Michener
*Assistant Examiner* — Michael B. Kreiner
(74) *Attorney, Agent, or Firm* — Rowan Tree Law Group, PLLC; Carson C. K. Fincham (57) ABSTRACT

Current foot-launched 2-stroke commercial PPG offerings can meet the specified threshold (and in some cases, objective) requirements for flight ceiling, payload capacity and range with little to no modification. We will discuss those in the next section. The APES system enhances the effectiveness and lethality of the PPG-equipped unit by reducing weight of the PPG, increasing reliability and redundancy, reducing pilot workload, and seamlessly integrating with UAV's and UGV's. System improvements in the following areas is assessed: Series hybrid-electric powertrain, Coaxial propellers. Localization, autopilot, and formations, Auto landing and other advanced features, Integration with unmanned systems, and Launch Considerations.

14 Claims, 5 Drawing Sheets

(56) References Cited

U.S. PATENT DOCUMENTS

| | | | | |
|---|---|---|---|---|
| 4,934,630 | A | * | 6/1990 | Snyder .................. B64C 31/036 244/69 |
| 5,160,100 | A | * | 11/1992 | Snyder .................. B64C 31/036 244/46 |
| 6,322,021 | B1 | * | 11/2001 | Fisher .................... B64C 31/032 244/49 |
| 6,360,991 | B1 | * | 3/2002 | Alan ........................ B64C 25/50 244/103 W |
| 6,364,251 | B1 | * | 4/2002 | Yim ........................ B64D 17/34 244/145 |
| 6,824,098 | B1 | * | 11/2004 | Belloso .................. B64C 31/036 244/145 |
| 6,877,690 | B1 | * | 4/2005 | Bragg ..................... B64C 37/00 244/219 |
| 7,048,227 | B2 | * | 5/2006 | Towley, III ............. B64C 35/00 244/13 |
| 8,104,718 | B2 | * | 1/2012 | Shaw ....................... B64C 3/30 244/146 |
| 8,231,083 | B2 | * | 7/2012 | Kutzmann ........... B65H 75/425 244/137.4 |
| 8,286,907 | B2 | * | 10/2012 | Dohi ..................... B64C 31/036 244/13 |
| 9,656,526 | B2 | * | 5/2017 | Nolan .................... B62D 57/04 |
| 10,308,358 | B2 | * | 6/2019 | Phan ..................... B64C 39/024 |
| 11,059,579 | B2 | * | 7/2021 | Levy ..................... B64C 25/001 |

OTHER PUBLICATIONS

Website: Vittorazi Motors: Moster 185 Plus, http://www.vittorazi.com/en/engine/motore/11-moster-185-plus/; 1 pps.

"MacPara Charger Manual," [Online]. Available: hittps://www.macpara.com/media/1868/user_manual_charger_en.pdf. Version1.0 Stand 1.2021; download date: Mar. 24, 2023; 42 pps.

M. Honeycutt, "flying to 17,000 Feet on My Paramotor . . . Without Oxygen!" [Online]. Available: hittps://www.youtube.com/watch?v=eUiscyWw2D8.

"Superfly Paraglicing: Gin Yeti Reserve," hittps://superflyinc.com/products/gin-yeti-reserve?psafe_param=1&utm_campaign=gs-2020-06-22&utm_source=google&utm_medium=smart_campaign&gclid=EAlalQobChM16sTS9Ov0_QIVGMmUCR03wgJIEAAYASAAEglit_D_BwE; download date: Mar. 24, 2023; 2 pps.

"Kicas Engineering," [Online]. Available: https://www.kicasengineering.com/efi; download date: Mar. 24, 2023; 5 pps.

K. Atherton, "Popular Science: American Special Forces Have a New Stealth Motorcycle," [Online]. Available: hittps://www.popsci.com/us-special-forces-new-stealth-motorccle-darpai; May 26, 2016: 1 pps.

"Mesodyne," [Online]. Available: https://www.mesodyne.com/: download date: Mar. 24, 2023: 8 pps.

"Skypower: SP-180 SRE Hybrid," [Online]. Available: https://skypower.oneline/produkt/sp-180-sre-hybrid/: download late: Mar. 24, 2023: 3 pps.

KDE Direct: KDE13218XF-105, [Online]. Available: https://www.kdedirect.com/collections/uas.multi-rotorbrushless-motors/products/kde13218xf-105: download date: Mar. 24, 2023: 4 pps.

"T-Motor: U15L," [Online]. Available: http://uav-en.tmotor.com/html/uav/html/2019/MannedAircraft_0703/274.html: download date: Mar. 24, 2023; 2 pps.

A. Naby and J.Rohacs, "Unmanned Measurement Platform for Paragliders," in 28th International Congress of Aeronautical Sciences; Budapest University of Technology and Economics: Department of Aircraft and Ships, 2012: 10 pps.

S. Fargher, "ATV.com: SkyRunner Flying UTV Review + Video," [Online]. Available: https://www.atv.com/utvs/skyrunner-flying-utv-review-video: download date: Mar. 24, 2023; 12 pps.

* cited by examiner

PARAMOTOR WITH CONTRAROTATING PROPELLERS

FIELD OF THE INVENTION

The invention pertains to the development of paramotors with contrarotating propellers.

BACKGROUND OF THE INVENTION

Current COTS components can achieve the threshold requirements, albeit with a weight penalty that will make launching and landing a chore. Many frames, engines, harnesses, and wings are available "a la carte" so a pilot may assemble a unit to his liking.

The Parajet Maverick [2] equipped with a Moster 185 engine [3] and a MacPara Charger [4] wing can be considered as a benchmark. The Maverick weighs about 54 lbs. dry, of which 31.3 lbs. is the Moster 185 engine. Additional safety equipment not included on a base unit, such as power floatation units, a reserve parachute, and fuel tanks in excess of the standard will likely add an additional 10 lbs.

The cruise fuel burn rate of a Moster 185 is listed as 4.2 L/hr. (1.1 gal/hr.), although it is reasonable to estimate that loaded with 80 lbs. of equipment in addition to the pilot, the burn rate will be higher (we will use 1.3 gal/hr.). The MacPara charger lists its speed as 50 kph (27 kt) with trimmers fully out and no speedbar (a fast but still efficient cruising configuration), so it will need to be aloft for 6.1 h (T) or 8.2 h (O), equating to 7.9 gal/50 lbs. (T) or 10.6 gal/67 lbs. (O) of fuel.

In order to meet the threshold requirements, a pilot will need to launch with 194 lbs. of weight in addition to his own body weight. This is not impossible but would be extremely unpleasant for the pilot to launch and would likely result in a high injury rate upon landing.

COTS wings designed for heavier pilots or tandem paramotoring would work for this system. The overall notional system weight would be 114 lbs. with a full fuel load. Adding the 330 lbs. (O) weight capacity would be 444 lbs., which is well within the recommended foot launch weight range (331-499 lbs.) for a MacPara Charger 34 wing. The speed range of a reflex wing such as the Charger is 33-61 kph (18-33 kt) and is adjusted by trims and a speedbar.

The flight ceiling requirements of 5000 ft (T) and 10,000 ft (O) are not difficult to achieve. There are many YouTube videos of pilots flying standard carbureted paramotors well in excess of these altitudes without substantial difficulty [5]. FAA regulations do not stipulate that pilots require oxygen until 12,500 feet, so no additional breathing equipment is required for either threshold or objective requirements.

Electric powered PPG's have recently begun to enter the market. These PPG's have several characteristics very desirable for the military mission, including instantaneous torque, high reliability, and quiet operation. However, their range/duration is substantially less than that required for the military mission.

Offerings from OpenPPG, Blackhawk, and Exomo generally have flight durations of 20-60 minutes, and batteries weigh in at about 1 pound per minute of flight time. As a point of comparison, the flight duration of the proposed gas-powered paramotor is 0.13 lbs. of fuel per minute of flight. A series hybrid electric propulsion system, discussed in the next section, may provide the benefits of electric PPG's while maintaining an operationally relevant range at a reasonable weight.

Several safety devices necessary to the nature of the military mission have become commonplace, lightweight, and reliable in recent years. These include reserve parachutes optimized for PPG usage with rapid opening even at slow falling rate, and sometimes include steering. One example of a reserve chute appropriate for the discussed weight class is the Gin Yeti, which has options for sizes up to 485 lbs. [6]. Another safety device which has become commonplace are "power floats"-systems which automatically inflate in the event of a water landing, which would be critical for the shipboard operations.

SUMMARY OF THE INVENTION

The goal of this invention is to design paramotors with contrarotating propellers.

A major goal will be to identify components for a candidate series electric hybrid system including an engine, generator, batteries, propulsion motor(s), and propellers optimized for the mission profile once we have a greater understanding of the requirements, and compare these to more traditional powertrains.

Another goal for the APES project is to select the exact computing, sensing, control, and actuation needs to support the autopilot and coordinated localization capabilities and provide a CONOPS document for how the system would be utilized by its pilots.

BRIEF DESCRIPTION OF THE DRAWINGS

The present invention is described in the detailed description that follows, with reference to the following noted drawings that illustrate non-limiting examples of embodiments of the present invention, and in which the reference numerals represent similar parts throughout the drawings.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth, the terms "an," and the are not limited to one element, but instead should be read as meaning "at least one/" The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Even though current COTS technology could meet all the threshold requirements; such a system would be extremely heavy and unwieldy (and impossible for a pure electric system).

Fortunately, for a system optimized for the desired mission profile and requirements, there are opportunities for significant improvements in fuel efficiency and weight.

The vast majority of current PPG engines are 2-stroke, single piston engines that require a mix of gasoline and oil, They are optimized for the recreational market, primarily for extremely low cost and a high power to weight ratio. Fuel efficiency, reliability, and noise are secondary concerns. Unlike general aviation, where reliability is paramount and any engine out is reportable to the FAA, engine outs in PPGs are considered routine facts of life and pilots take advantage of their craft's ability to land in extremely tight spaces when these occur. The need for Marines to be able to take off from a ship, travel substantial distances over water, and land undetected at a precise location means that the optimization equation is quite different than the recreational market.

Engine efficiency in PPGs has improved greatly in recent years. Electronic fuel injection is not yet commonplace in PPGs, but aftermarket kits are available have been reported to reduce fuel consumption by up to 30%, at the expense of adding a few pounds to the engine [7]. Perhaps the largest efficiency loss comes from the fact that the engines must be sized for the largest possible power needed, but are often run far lower than that, in an area of the power band which is less efficient. In a typical PPG, cruising power is typically between ¼ and ½ of total power of the engine, which is only used when climbing rapidly.

Series electric hybrid powertrains are an excellent option for these situations in which the average and peak power needs differ greatly. In a series electric hybrid system, an internal combustion engine turns an electric generator, which then charges a set of batteries, which power an electric motor, which would then power the propeller. This allows the engine to be sized just barely larger than the power needed to cruise and keep the batteries charged.

The engine can also always run in its most efficient power band, and it can be switched off whenever the battery charge is sufficient, or the pilot wants no engine noise. Electric motors are far smaller and lighter than internal combustion engines of equivalent power output.

Because of this, the combination of a downsized engine, generator, a small battery bank, and motor can often be roughly equivalent in weight to a standard engine. Both winners of a similar, recent SBIR for a long range, silent, reliable motorcycle for special forces used a similar powertrain[8]. As discussed in the following section, redundant motors in a coaxial configuration are even possible, greatly improving the reliability and safety of the system in the event of a motor failure.

A benefit of this setup is that the propulsion system (motor) is separate from the energy generation (engine) and energy storage (battery) systems, so a more modular system is possible. Both energy generation and storage technologies are rapidly advancing, so if better batteries or an improved method of generating electricity is developed (such as a more efficient engine, fuel cell, or thermophotovoltaic generator [9]), it would be able to be integrated without a complete system redesign.

Other side benefits include having a large enough electrical system to power avionics or soldier-worn electronics, or to act as a field battery charger, either in flight or on the ground.

Of particular relevance to this project, we have developed test stands, equipment, and methodologies for selecting motors, propellers, and batteries to optimize thrust and flight/time efficiency for UAVs from 5 lbs. to 55 lbs.

Additionally, we have developed advanced monocoque carbon fiber body designs, rugged/lightweight track systems, custom UAV power electronics, flight controllers and computers that can accept a wide variety of connectivity and payloads in order to meet the difficult requirements and diverse capabilities required of the systems.

A major goal will be to identify components for a candidate series electric hybrid system including an engine, generator, batteries, propulsion motor(s), and propellers optimized for the mission profile once we have a greater understanding of the requirements, and compare these to more traditional powertrains, A Moster 185 engine, which we used as the representative powerplant in section 2.2, produces 25 hp (18.6 kW) peak power.

We estimate that a series hybrid-electric system will require a 10-15 kW generator and either a single 18-20 kW or double 10-15 kW electrical motors. These are available as COTS or easily customizable components. It is likely that the motor will be one designed for UAV use, as these are optimized for many of the same requirements (reliability, efficiency, power to weight ratio) as this project.

Excellent choices in the 10-20 kW range are available from manufacturers such as AIE, Rotron, Northwest UAV, and Skypower, some of which come with built-in generators for use in series-electric hybrid systems. In some cases, such as the Skypower SP-180 [10], the motors are flex-fuel compatible, allowing Marines to use heavy fuels such as JP-8 instead of having to keep gasoline on hand, Multiple electric motor manufacturers have electric motors of this size available, including both KDE [11] and Tiger Motor [12], which Robotic Research have worked with in the past.

The hybrid-electric powertrain discussed in the previous section could be used to power a single electrical motor turning a single propeller, much like traditional ICE-powered PPG, However, many benefits could be gained by using two electrical motors to turn two contra-rotating, coaxial propellers. These benefits include improved redundancy and safety of the system, improved efficiency, removal of torque steering characteristics, and the ability to do mild turning during cruise via differential thrust.

In the proposed system, each coaxial motor would be powerful enough to maintain a steady cruise or a slight climb, Each motor would be powered via a separate speed controller from the battery bank. For the over-water mission, the most important benefit of this configuration is redundancy. If one motor or controller fails, the remaining motor would be sufficient to keep the pilot in the air with reduced performance.

The efficiency of a propeller producing thrust is proportional to the "disc area" of the propeller. The noise volume of a propeller is inversely proportional to the tip speed of the propeller. The easiest way to improve both characteristics is to use a larger prop. However, on PPGs, the diameter of the propeller is practically limited to about 130 cm, above which the bulk of the unit limits the ability of the pilot to handle his wing on the ground.

Utilizing coaxial propellers is a way around this size limitation, gaining back substantial efficiency while maintaining the same rotor diameter. On the Robotic Research Pegasus 3 "Megasus" hybrid UAV/UGV, we utilized the characteristics of the coaxial motor to solve the problem of the conflicting constraints of heavy lift/payload capabilities (55 lbs.), while still being able to drive through a doorway.

To properly design this motor, Robotic Research developed a propulsion test stand and evaluated combinations of potential motors, motor controllers, and propellers for Megasus. The stand includes mounting provisions for various motors and props as well as a load cell, tachometer, voltage/current measurement, and computing hardware.

Software was designed for the test stand that allows us to quickly test many design permutations to evaluate their performance. The software also automatically creates logs of the test data for later evaluation and comparison. Once we had selected the optimal parameters of motors, we worked with KDE, a high-end UAV electrical motor manufacturer to develop a custom coaxial motor with voltages and windings to our exact specifications, while maintaining a compact mechanical package.

This motor pair, was found to generate 80% more thrust than a single equivalent motor and be 20-25% more efficient than a single motor for a given amount of generated thrust. Robotic Research has continued to optimize motor selection for the Pegasus family of hybrid UAV/UGV's using our test stand and would be well prepared to conduct a detailed study on the optimal motor and prop configuration for the APES System.

In a PPG, one of the characteristics making handling difficult are the torque effects of the propeller. There are multiple factors that cause a paramotor to yaw or twist when power is applied, which can be quite substantial at full power [1, p. 238]. Most modern parameters account for this either by offsetting the hang points of the motor so the weight of the pilot counteracts the propeller torque, or by adding aerodynamic features to the cage to modify the direction of airflow.

Neither of these are optimal, and result in uneven handling at different throttle levels, or efficiency losses. Having contra-rotating propellers would create a net zero reaction torque at all power levels, making the paramotor easier to control while maintaining or improving efficiency.

A final benefit of the contra-rotating propellers is the ability to turn the PPG using differential torque. In a quadrotor UAV, yaw control is achieved by applying differential torques to the CW or CCW rotating props. Similarly, on a PPG, this differential torque would allow for controllable torque steering. This would enable a pilot to precisely turn the PPG without using brake inputs (and thus, gain efficiency).

More critically, however, this control would likely be all the turning force required for an autopilot feature to keep a constant heading or ground track or do gradual heading adjustments, greatly simplifying the actuation needed for such a system.

Localization, Autopilot, and Formations: It is reasonable to assume that for the range/duration of the missions that the APES will need to undertake (6-8 hours), some form of autopilot and navigation system will be necessary in order to reduce the physical and cognitive workloads on the Marine pilots so they can be an effective fighting force when they arrive at their destination. This autopilot and navigation system could be as simple as a display giving an overhead view of the flight and waypoints.

However, it would be far more useful, and reasonably easy to implement a system which also flew the PPG along prescribed waypoint routes and kept a group of the PPG systems information with each other, even in the absence of GPS. Such an autopilot would also free the pilot to fend off any threats that might emerge during transit.

Robotic Research's greatest technical strength lies in coordinated localization and planning of people and vehicles, particularly in GPS-denied environments. We also have a successful history of developing new robotic platforms and retrofitting manually operated vehicles for autonomous operations, Although pilots can typically rely on GPS, the ability to operate without it is critical in potentially hostile environments where it can easily be jammed.

Robotic Research has developed a "Family of Systems" (FoS) under the MACS-B program, a group of asymmetric assets which work together to explore, map, and observe. The FoS includes several different sizes of the Pegasus hybrid UAV/UGV, other small UAVs, large robotic ground vehicles, manned vehicles, unattended ground sensors, and human-wearable location systems (WarLoc™).

Robotic Research is the autonomy kit provider for the Autonomous Ground Resupply (AGR) and Expedient Leader-Follower (ExLF) projects which are the first projects to provide unmanned autonomous tactical wheeled vehicles in quantity to the U.S. Military (70+ PLS Trucks for the Army and 4 LVSR Trucks for the Marines). These systems provide a leader-follower capability with robotic follower trucks following directly (within a tire width) behind a manned leader vehicle at speeds up to 45 mph over varied terrain, including GPS-denied areas.

Incorporating sufficient actuation to autopilot a PPG, adding localization/communication equipment to add the PPG into the coordinated localization FoS, and following navigational waypoints or having follower PPG's in formation behind a leader are all well within our capabilities.

Incorporating autopilot features and localization into the APES requires the addition of a small amount of hardware to the PPG system. At the core of this infrastructure is the Robotic Research designed Small Robot Navigation System (SR-NAY), a modular control and localization system useful for a variety of purposes on small robots, manned vehicles, dismounted personnel, and unmanned ground sensors.

It includes Inertial Sensors, Magnetometers, Barometric Sensors, and a number of interfaces allowing it to connect to high-quality (centimeter-level) GPS units, Ultra-Wideband ranging radios, and cameras. The microprocessor may be coupled with a high-performance Linux processor (NVIDIA TX2 SOM), which can be used for sensor processing, path planning, or (in the future) GPU-accelerated Neural Network learning algorithms.

The SR-NAY was designed for installation on small robots (3.2×2.0×8", 125 g in nominal configuration) and has been or is currently being integrated onto a number of systems including the RR Pegasus Family, several other small UAVs and UGV's, and it utilizes the same architecture as the navigation units used on the AGR PLS and our WarLoc™ pedometer units.

Its SWAP-C footprint is small enough that it is a good fit for a foot-launched PPG. The other major required component would be a navigation display and controller for the autopilot features.

The Robotic Research Pocket Universal Controller Kit (PUCK) is a ruggedized tactical edition Android phone using the Android Tactical Assault Kit (ATAK) software, and an optional rugged gamepad-style controller. ATAK is the software module used in the Nett Warrior program, and Robotic Research is one of very few contractors permitted access to the software codebase and allowed to add software modules to expand functionality.

The PUCK and ATAK software can control multiple unmanned platforms, display positions of all platforms and assets in the coordinated network and could be easily adapted to setting autopilot waypoints for manned vehicles or configuring formation/leader-follower flights for groups of APES PPGs. Should GPS-compromised or denied operations be desired, Robotic Research could easily integrate additional sources of information into its coordinated localization network, including celestial navigation or sensors for mapping/terrain following registration algorithms.

Actuating the APES system for autopilot would be far less complex than most unmanned or optionally manned systems Robotic Research have developed. If a coaxial motor setup was used as suggested in the previous section, the only controls needed would be for throttle of each motor, and an actuator on the speedbar, which changes the angle of attack of the wing with respect to the pilot (and has the net effect of changing the speed of the glider).

This actuation would allow control of the climb/sink rate of the PPG (via overall thrust), yaw of the PPG (via differential thrust), and speed (via speedbar manipulation). If more aggressive turning is required, or the coaxial propeller setup is not used for some reason, the brake toggles would need to be actuated, similar to the PPG UAV seen in the reference [13]. Brake toggle actuation would be also be needed for more advanced pilot assistance behaviors, detailed in the next section.

A second major effort for Phase 1 of the APES project would be to select the exact computing, sensing, control, and actuation needs to support the autopilot and coordinated localization capabilities and provide a CONOPS document for how the system would be utilized by its pilots.

Auto Landing and Other Features: In addition to point-to-point autopilot features, the APES system could make use of more advanced pilot assistance features to reduce workload and improve safety. This could be of particular use during the landing phase, one of the most challenging phases of PPG flight.

The primary challenges of landing a paraglider are determining the direction of the wind and flaring the wing at the precise time to minimize the forward and vertical speed of the landing. With good visibility, training, and enough time to observe the landing site and wind indicators, this can be reliably trained. Adding a heavy fuel load and up to 80 lbs. of additional gear reduce the margin for error for landing without injury to the pilot.

The nature of Marine missions with the APES system mean that operations at night, using night vision goggles, are likely. NVG's reduce or eliminate depth perception, making a proper landing flare far more difficult. One solution that could potentially increase the margin for error on landings is to have a "trike" or "quad" wheeled version of the PPG, but that seems to go against the desire of the RFP. Instead, we propose adding sensing for mapping and high-accuracy altitude measurement, and actuation to control the brakes to maintain proper heading on landing and apply an ideal landing flare.

To use the Auto-Landing feature the operator would identify the desired landing site using the control tablet. The system would slowly fly one or two circles over the desired site to estimate wind speed and direction.

Meanwhile, it would be using its onboard sensors (likely LIDAR, as it needs to work at night) to map the area, ensuring a clear site and a good height map. The autopilot system or pilot would then set up a landing approach to land at the desired site. Using the LIDAR as an altimeter, and referencing the map built during the approach, the auto-landing system would head the correct direction to a clear area, remove power to the motor and apply brakes in a controlled manner to do a controlled ideal flare, every time. This same landing algorithm would be used if unmanned PPG's were ever used to augment the manned APES systems, as discussed in the next section.

If photogrammetric or LIDAR sensors were added to the APES system for this purpose, many other opportunities open up for using the systems for aerial mapping and reconnaissance and allowing NOE flight with obstacle avoidance at night. During Phase I, Robotic Research will work with the customer to examine which, if any advanced pilot assistance or mapping features are desired in a prototype and work the necessary components into the system design.

An infantry force which can be delivered deep into enemy territory via PPGs is a powerful reconnaissance asset. However, Marines flying APES into battle will necessarily be limited to what they can carry with them on the PPGs and on their feet once they land. The overburdening of combat troops is a well-known problem, and the RFP calls out that the proposed PPG system must handle 80 pounds of equipment in addition to the weight of the pilot.

Recently, the Army has been experimenting with Squad Mobility Equipment Trailer (SMET) and other "Robotic Mule" programs to offload much of the weight from combat troops. These unmanned vehicles are designed to follow and coordinate with the infantry troops and enable them to carry hundreds of pounds equipment and heavy weapons which would make them a far more lethal fighting force. The possibilities of flying unmanned, PPG-powered SMET or UTV-class vehicles laden with equipment and heavy weaponry in formation with the manned APES PPG's, and landing alongside of them ready to fight could be transformative.

Not only would the Marines arrive at their destination with more equipment and weapons than they could individually carry, they would be more rested agile, and effective both in the air and on the ground.

Robotic Research has developed autonomy and drive-by-wire kits for several vehicles in this class, including a Polaris MRZR and both 4- and 8-wheeled versions of the General Dynamics MUTT platform, and equipped them with the communications and other equipment to communicate and coordinate with other assets in the family of systems. Additionally, at least one hybrid powered parachute (PPC)/UTV exists, the SkyRunner [14].

As the only manufacturer of hybrid UAV/UGVs currently supplying the U.S. Military, we believe that we are the best candidate to augment an SMET-class platform with a PPG-style motor and wing, or to equip a SkyRunner-style vehicle with fly-by-wire and autonomous controls and integrate them with manned PPG systems.

We will work with the customer to identify what, if any, coordination with unmanned systems is in the desired. Designing a second, vehicular PPG system is potentially beyond the scope of what we can do for a Phase II prototype. However, if actuation is added to the manned APES system for autopilot, auto landing or other pilot assistance behaviors, we would likely equip the APES system to be flown remotely without a pilot to test the system at minimal risk.

This system could be used as a proof-of-concept demonstrator along with a manned APES system to demonstrate future coordinated manned-unmanned teaming efforts should a second design not be feasible in the time allotted.

Launch and Landing Considerations: The APES system must be foot-launchable and include a methodology for ship launches, but ideally, would be air-launched, To be foot-launchable, the system must, first and foremost, be as light as possible while meeting the requirements, Ideal conditions for foot-launching a PPG are to head into a 7-10 mph headwind [1, p. 57], where a "1-step launch" is very possible with proper technique.

Launching from a ship with a reasonable flight deck, if the ship is free to maneuver to support the launches, should be easier than launching from land, as the ship can point in whatever direction necessary to provide the pilots with the ideal headwind. However, there are unique dangers to the shipboard environment (wing gets caught in a gust, pulling pilot over the side) which need to be considered, and perhaps mitigated with features such as releasable tethers to the flight deck.

Aerial deployment of a PPG is an exciting proposition which would add tremendous military utility to the APES system, Paragliding wings have several fundamental differences from standard parachutes and are not generally designed to deploy at high speeds. The area of soft aerodynamic structures is outside of Robotic Research's area of expertise, but we have several ideas for methods which may work, including semi-rigid structures, drogue chutes, and hybrid paraglider/parachutes.

We would be excited to contact designers and manufacturers of paragliders and parachutes the threshold this objective requirement become more important in the future.

The present invention comprises a paramotor system with contrarotating propellers and has a structural frame and or cage, a flexible wing (paraglider or parachute) for providing lift, one or more propulsion units, and multiple propellers capable of rotating in opposite direction and providing thrust.

In this system, the multiple propellers are used in order to cancel out undesirable torque effects. Torque is the rotational equivalent of linear force. It is also referred to as the moment, moment of force, rotational force or turning effect, depending on the field of study. The concept originated with the studies by Archimedes of the usage of levers. In this system, the multiple propellers are used to provide differential torque to steer the paramotor.

In this system, the multiple propellers are used to increase thrust efficiency. In this system, the multiple propellers/propulsion units are used in a redundant manner to increase reliability and safety.

In this system, the propellers are mounted in a coaxial or side-by-side configuration. Coaxial means that two or more three-dimensional linear forms share a common axis. Thus, it is concentric in three-dimensional, linear forms. A coaxial cable, as a common example, is a three-dimensional linear structure. Also, in this system, the rigid or semi-rigid wing can be used instead of a flexible wing. Semi-rigid wings refer to stiff solid wings that are not inflexible.

In this system, the propulsion unit(s) is/are an internal combustion engine, turbine, electric motor, or hybrid-electric system. Internal-combustion engine, any of a group of devices in which the reactants of combustion (oxidizer and fuel) and the products of combustion serve as the working fluids of the engine. Such an engine gains its energy from heat released during the combustion of the nonreacted working fluids, the oxidizer-fuel mixture. The work produced by a turbine can be used for generating electrical power when combined with a generator. Hybrid electric vehicles are powered by an internal combustion engine and an electric motor, which uses energy stored in batteries. A hybrid electric vehicle cannot be plugged in to charge the battery. Instead, the battery is charged through regenerative braking and by the internal combustion engine.

In this system the paramotor is used for foot-launch, or being mounted on a frame with wheels, tracks, skis, pontoons, or a displacement hull. A pontoon boat is a flattish boat that relies on floats to remain buoyant. These pontoons contain much reserve buoyancy.

In this system the paramotor system is launched from another aircraft. In this system, the paramotor is attached to or integral to a ground or surface vehicle with separate ground or water propulsion. In this system, the paramotor is unmanned or optionally manned.

Figure 1A:
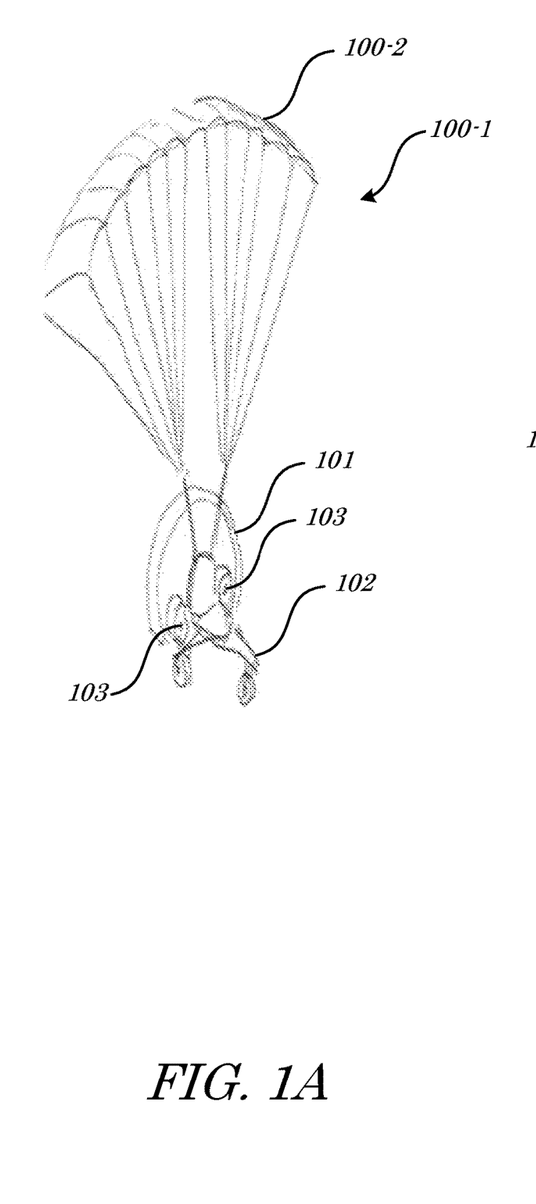
FIG. 1A and FIG. 1B are front perspective and partial rear perspective views of a paramotor with counter-rotating propellers according to some embodiments.
Figure 1B:
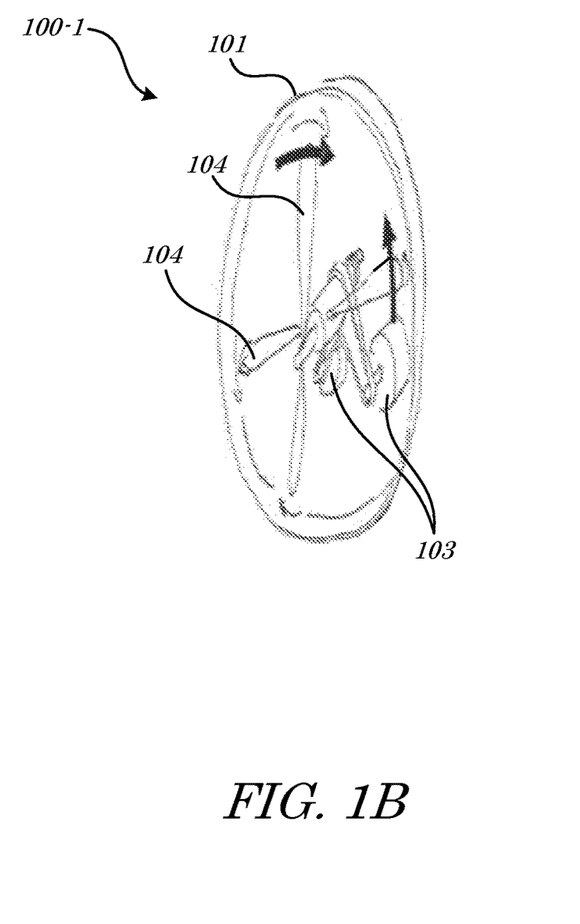

In this system the system the propellers have fixed or variable-pitch propellers. In this system, the propellers are ducted fans or jets instead of propellers. In this system, the propellers are geared to one another or have independently adjustable speed, FIG. 1A and FIG. 1B are front perspective and partial rear perspective views of a paramotor with counter-rotating propellers according to some embodiments This is a schematic shown in FIG. 1A and FIG. 1B which is schematic of a paramotor 100-1 with contrapropellers with all the parts labelled. The parts labelled in the figures include a flexible wing 100-2, a propeller cage 101, a structure 102, one or more propulsion units 103, and multiple propellers 104.

Figure 2A:
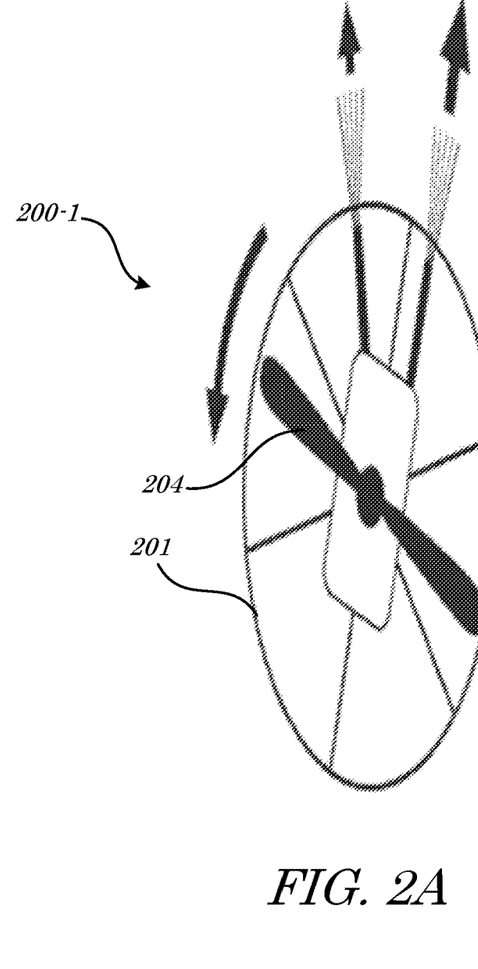
FIG. 2A, FIG. 2B, and FIG. 2C are rear views of a paramotor with counter-rotating propellers according to some embodiments, depicting propeller drag and torque shown as the propellers move.
Figure 2B:
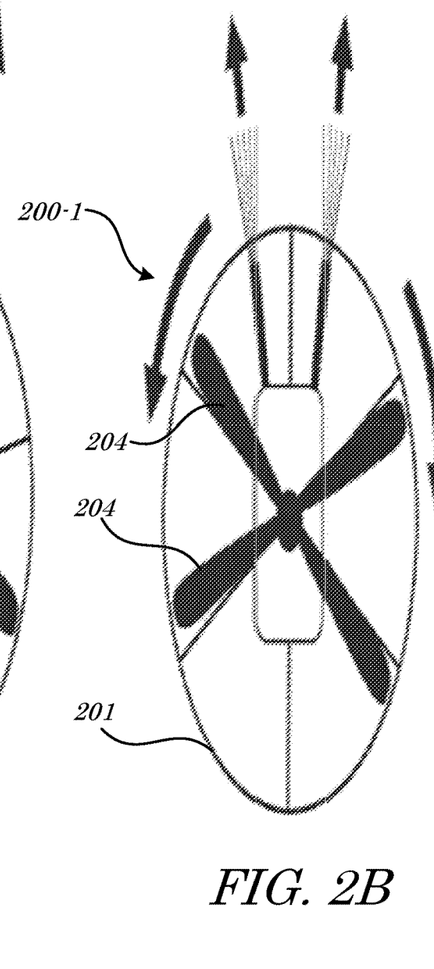
Figure 2C:
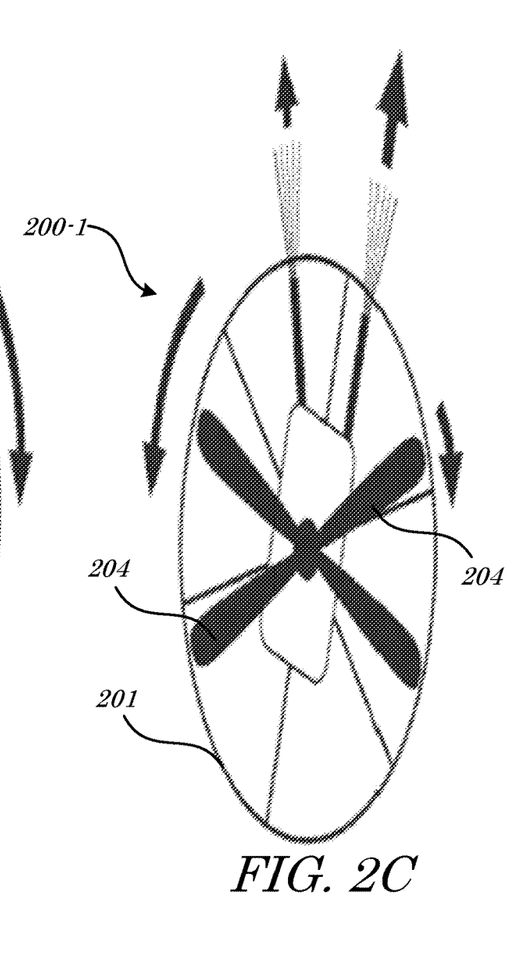

FIG. 2A, FIG. 2B, and FIG. 2C are rear views of a paramotor 200-1 comprising a propeller cage 201 with counter-rotating propellers 204 according to some embodiments, e.g. depicting propeller drag and torque shown (with directional thrust arrows) as the propellers move (as shown with rotational direction arrows).

Figure 3A:
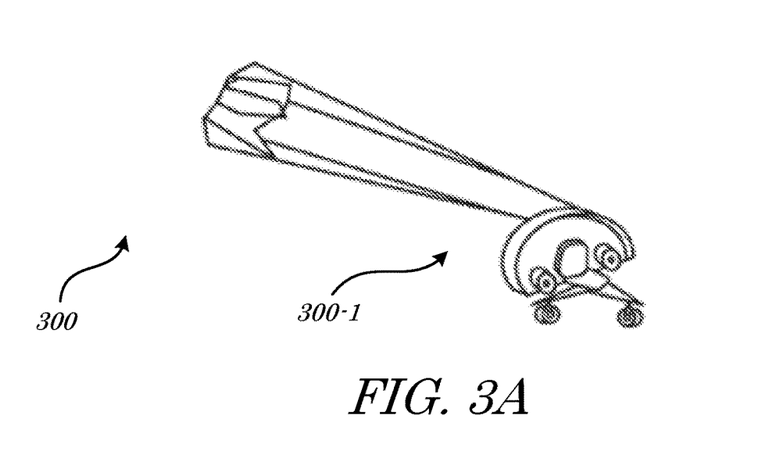
FIG. 3A is a perspective view of a deployment system for a paramotor with counter-rotating propellers according to some embodiments.
Figure 3B:
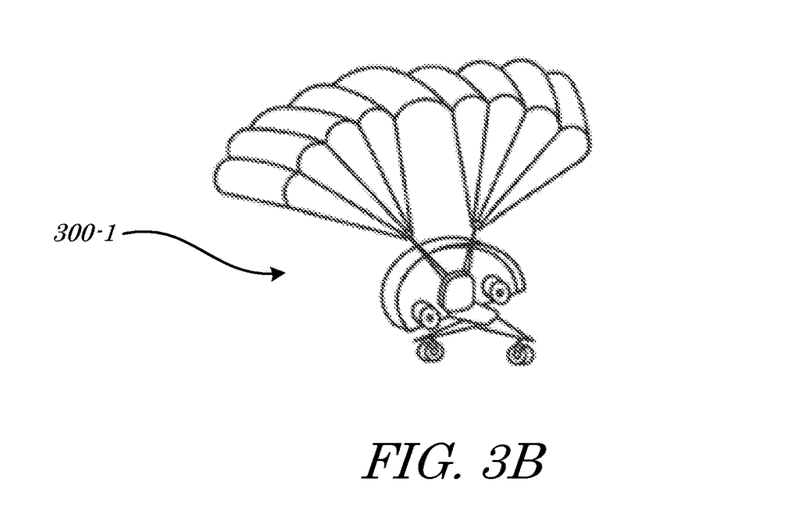
FIG. 3B is a perspective view of a deployed of a paramotor with counter-rotating propellers according to some embodiments.

FIG. 3A is a perspective view of a deployment system 300 for a paramotor 300-1 with counter-rotating propellers according to some embodiments and FIG. 3B is a perspective view of the deployed paramotor 300-1 with counter-rotating propellers, according to some embodiments. In FIG. 3A, an airplane 306 may transport the paramotor 300-1 in an undeployed state and drop the paramotor 300-1 such that it deploys, as shown in FIG. 3B.

Figure 4A:
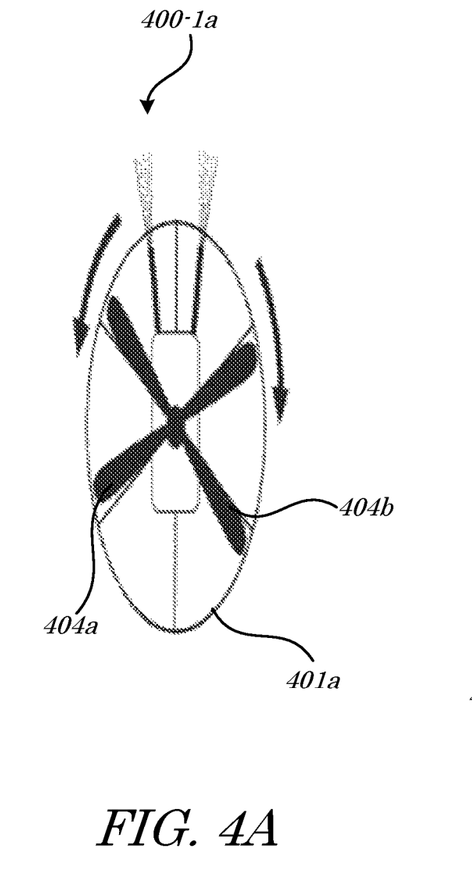
FIG. 4A and FIG. 4B are rear views of a paramotor with counter-rotating propellers according to some embodiments, depicting coaxial configurations and side by side configurations, respectively.
Figure 4B:
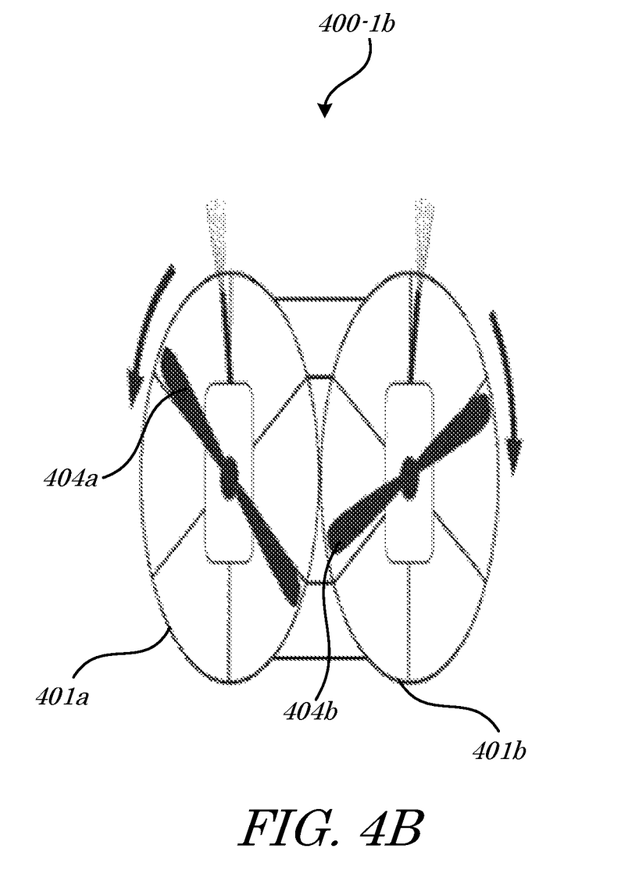
Figure 5A:
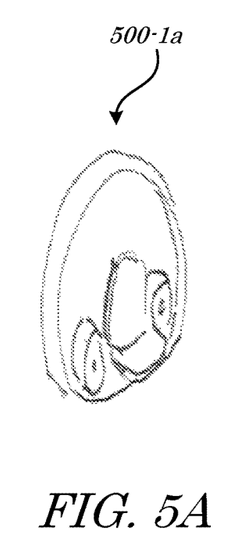
FIG. 5A, FIG. 5B, FIG. 5C, FIG. 5D, and FIG. 5E are perspective views of Paramotors showing the use of foot launch, wheel launch, pontoon launch, and ski launch displacement hull configurations, respectively.
Figure 5B:
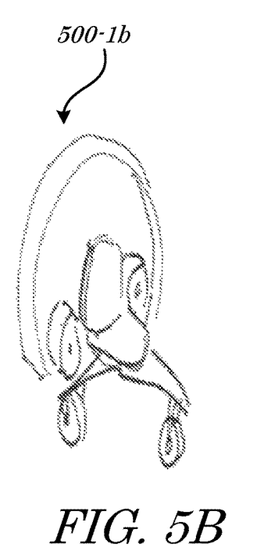
Figures 5C, 5D:
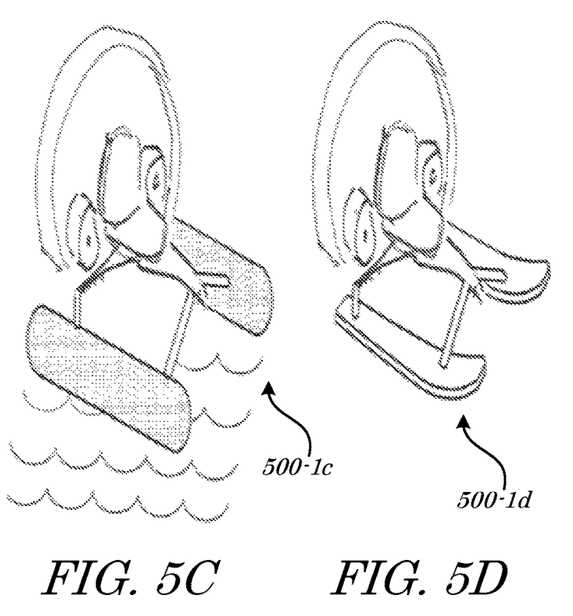
Figure 5E:
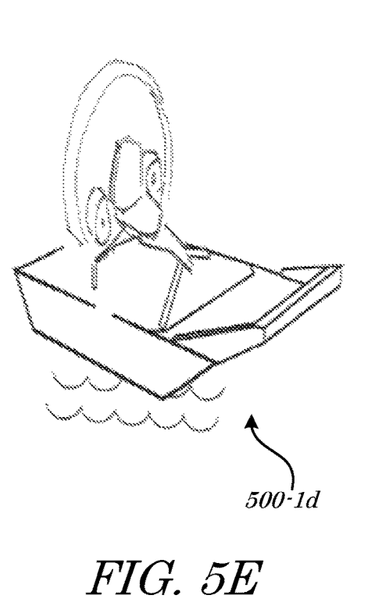

FIG. 4A and FIG. 4B are rear views of different configurations of a paramotor 400-1a, 400-1b with counter-rotating propellers according to some embodiments, depicting a first paramotor 400-1a with a-coaxial configuration and a second paramotor 400-1b with a side-by-side configuration. Each paramotor 400-1a, 400-1b comprises a first propeller cage 401a and two (2) counter-rotating propellers 404a-b. The coaxial configuration of the first paramotor 400-1a houses both of the two (2) counter-rotating propellers 404a-b in the first (or single) propeller cage 401a, while in the side-by-side configuration of the second paramotor 400-1b, a first propeller cage 401a houses a first propeller 404a and a second propeller cage 401b houses a second propeller 404b.

FIG. 5A, FIG. 5B, FIG. 5C, FIG. 5D, and FIG. 5E are perspective views of paramotors 500-1a, 500-1b, 500-1c, 500-1d, 500-1e showing the use of foot launch, wheel launch, pontoon launch, and ski launch and displacement hull configurations, with respect to a first or foot-launched paramotor 500-1a, a second or wheel-launched paramotor 500-1b, a third or pontoon-launched paramotor 500-1c, a fourth or ski-launched paramotor 500-1d, and a fifth or displacement hull-launched paramotor 500-1e, respectively.

The invention claimed is:

1. A paramotor system with contrarotating propellers, comprising:
   I. a paramotor, comprising:
      a. a structural frame;
      b. a wing for providing lift, the wing being connected to the frame;
      c. a first propeller configured to rotate in a first direction;
      d. a second propeller configured to rotate in a second direction; and
      e. a series electric hybrid powertrain coupled to the structural frame, the series electric hybrid powertrain, comprising:
         i. a set of batteries;
         ii. a generator coupled to charge the set of batteries;
         iii. a first electric motor coupled to receive electrical power from the set of batteries and coupled to power the first propeller; and
         iv. a second electric motor coupled to receive electrical power from the set of batteries and coupled to power the second propeller; and
      f. an autopilot system that automatically adjusts speeds of the first and second propellers to guide the paramotor along a navigational route, the autopilot system comprising:
         i. a sensor device capable of determining location information for the paramotor,
         ii. a first speed controller coupled to adjust a speed of the first propeller;
         iii. a second speed controller coupled to adjust a speed of the second propeller;
         iv. a speedbar actuator coupled to adjust an angle-of-attack of the wing; and
         v. a processing unit in communication with each of the sensor device, the first speed controller, the second speed controller, and the speedbar actuator, wherein the processing unit (a) automatically instructs the first speed controller and the second speed controller to adjust a heading of the paramotor and (b) and automatically instructs the speedbar actuator to adjust an altitude of the paramotor, both in response to location information received from the sensor device.

2. The system of claim 1, wherein the generator comprises a thermophotovoltaic generator.

3. The system of claim 1, wherein the generator comprises a fuel cell.

4. The system of claim 1, wherein the generator is sized between 10-kW and 15-kW.

5. The system of claim 1, wherein the electric motors are sized between 10-kW and 15-kW.

6. The system of claim 1, wherein the first and second propellers are mounted in a coaxial configuration.

7. The system of claim 1, wherein the wing comprises a rigid wing.

8. The system of claim 1, wherein the series electric hybrid powertrain further comprises:
   v. an internal combustion engine coupled to power the generator.

9. The system of claim 1, wherein the paramotor is used for foot-launch, or being mounted on a frame with wheels, tracks, skis, further comprising:
   g. pontoons coupled to the structural frame.

10. The system of claim 1, further comprising:
    II. an airplane from which the paramotor is launched.

11. The system of claim 1, wherein the first and second propellers comprise variable-pitch propellers.

12. The system of claim 1, wherein the sensor device comprises a LIDAR altimeter and wherein the autopilot system is operable to automatically land the paramotor based on readings from the LIDAR altimeter.

13. The system of claim 1, wherein the first and second propellers are mounted in a side-by-side configuration.

14. The system of claim 1, wherein the wing comprises a semi-rigid wing.

* * * * *